United States Patent
Kuperman

(10) Patent No.: US 12,299,500 B1
(45) Date of Patent: May 13, 2025

(54) OPTIMIZING CLOUD INSTANCES WITH SMART AVAILABILITY ZONE FAILOVER

(71) Applicant: CAST AI Group, Inc., North Miami Beach, FL (US)

(72) Inventor: Leonid Kuperman, Toronto (CA)

(73) Assignee: CAST AI Group, Inc., Miami, FL (US)

( * ) Notice: Subject to any disclaimer, the term of this patent is extended or adjusted under 35 U.S.C. 154(b) by 0 days.

(21) Appl. No.: 18/748,682

(22) Filed: Jun. 20, 2024

Related U.S. Application Data

(60) Provisional application No. 63/638,969, filed on Apr. 26, 2024.

(51) Int. Cl.
*G06F 9/46* (2006.01)
*G06F 9/50* (2006.01)

(52) U.S. Cl.
CPC ...... *G06F 9/5088* (2013.01); *G06F 2209/509* (2013.01)

(58) Field of Classification Search
CPC .......................... G06F 9/5088; G06F 2209/509
See application file for complete search history.

(56) References Cited

U.S. PATENT DOCUMENTS

| | | | |
|---|---|---|---|
| 11,595,306 B2 | 2/2023 | Masnauskas et al. | |
| 11,928,491 B1 * | 3/2024 | Zhang | G06F 8/63 |
| 11,966,306 B1 * | 4/2024 | McGarry | G06F 11/3006 |
| 2021/0036957 A1 * | 2/2021 | Kuang | H04L 43/0823 |
| 2024/0028415 A1 * | 1/2024 | Wang | H04L 47/783 |

OTHER PUBLICATIONS

Lee et al., SpotLake: Diverse Spot Instance Dataset Archive Service, Kookmin University, 2022, 14pages.*
McCullagh et al., Rapidly recover from application failures in a single AZ, May 2023, Elastic Load Balancing, Networking & Content Delivery, retrieved from AWS.amazon.com, 11 pages. (Year: 2023).*

* cited by examiner

*Primary Examiner* — Diem K Cao
(74) *Attorney, Agent, or Firm* — Fenwick & West LLP

(57) ABSTRACT

A method or a system for enhancing cloud computing operations across various availability zones (AZs) of a cloud service provider (CSP). A set of performance metrics for multiple AZs are determined through data collection and analysis using a machine learning model. An initial AZ is selected for deploying an application based on the current performance metrics. The application is then deployed on this AZ. Continuous monitoring of these metrics is conducted to assess the performance of the deployed AZ. If the performance decreases to a predefined threshold, a second AZ is selected based on the latest performance metrics. The application is subsequently switched from the first AZ to the second AZ.

20 Claims, 11 Drawing Sheets

AZ Failover Policy

700

Primary AZ

[ us-east 1-f    X ▶ ]    *Current recommendation based on the Latest AZ pricing and stability*

Availability Zone Details

[ 🔍 Search ]    ≡ Filters

| AZ list | Spot Cost | Interruption Rate | ICE Rate |
|---|---|---|---|
| us-east-1-a | 0.044 | 5.3% | 0.80% |
| us-east-1-b | 0.034 | 5.2% | 0.30% |
| us-east-1-c | 0.042 | 5.6% | 0.40% |
| us-east-1-d | 0.028 | 6.0% | 0.00% |
| us-east-1-e | 0.032 | 2.6% | 0.10% |
| us-east-1-f | 0.023 | 1.5% | 0.05% |

Service history

The following table is a running log of AWS service interruptions for the past 12 months. Choose a status icon to see status updates for the service. All dates and times are reported in Pacific Daylight Time (PDT). To update your time zone, see Time zone settings.

Find an AWS service or Region

Service * EC2  ×    2024/03/30

Clear filters

North America | South America | Europe | Africa | Asia Pacific | Middle East | All locales

< 1 >

| Service | RSS | Today | Mar 29 | 28 Mar | 27 Mar | 26 Mar | 25 Mar | 24 Mar |
|---|---|---|---|---|---|---|---|---|
| Amazon Elastic Compute Cloud (Bahrain) | 📶 | 🕐 | 🕐 | 🕐 | 🕐 | 🕐 | 🕐 | 🕐 |
| Amazon Elastic Compute Cloud (Calgary) | 📶 | 🕐 | 🕐 | 🕐 | 🕐 | 🕐 | 🕐 | 🕐 |
| Amazon Elastic Compute Cloud (Canada-Central) | 📶 | 🕐 | 🕐 | 🕐 | 🕐 | 🕐 | 🕐 | 🕐 |
| Amazon Elastic Compute Cloud (Cape Town) | 📶 | 🕐 | 🕐 | 🕐 | 🕐 | 🕐 | 🕐 | 🕐 |
| Amazon Elastic Compute Cloud (Frankfurt) | 📶 | 🕐 | 🕐 | 🕐 | 🕐 | 🕐 | 🕐 | 🕐 |
| Amazon Elastic Compute Cloud (Hong Kong) | 📶 | 🕐 | 🕐 | 🕐 | 🕐 | 🕐 | 🕐 | 🕐 |
| Amazon Elastic Compute Cloud (Hyderabad) | 📶 | 🕐 | 🕐 | 🕐 | 🕐 | 🕐 | 🕐 | 🕐 |
| Amazon Elastic Compute Cloud (Ireland) | 📶 | 🕐 | 🕐 | 🕐 | 🕐 | 🕐 | 🕐 | 🕐 |
| Amazon Elastic Compute Cloud (Jakarta) | 📶 | 🕐 | 🕐 | 🕐 | 🕐 | 🕐 | 🕐 | 🕐 |

| | | | | |
|---|---|---|---|---|
| 1 | gcloud compute zones list -- project ABCDE | | | |
| 2 | | | | |
| 3 | NAME | REGION | STATUS | NEXT MAINTEANCE TURNDOWN_DATE |
| 4 | us-east1-b | us-east1 | UP | |
| 5 | us-east1-c | us-east1 | UP | |
| 6 | us-east1-d | us-east1 | UP | |
| 7 | us-east4-c | us-east4 | UP | |
| 8 | us-east4-b | us-east4 | UP | |
| 9 | us-east4-a | useast4 | UP | |
| 10 | us-central1-c | us-central1 | UP | |
| 11 | us-central1-a | us-central1 | UP | |
| 12 | ... | | | |

OPTIMIZING CLOUD INSTANCES WITH SMART AVAILABILITY ZONE FAILOVER

CROSS REFERENCE TO RELATED APPLICATION

This application claims the benefit of U.S. Provisional Application No. 63/638,969 filed Apr. 26, 2024, which is incorporated by reference in its entirety.

TECHNICAL FIELD

This disclosure relates generally to cloud computing, and more specifically automatic selection of availability zone in response to detection of failover.

BACKGROUND

Spot instances provide a cost-effective solution for entities to exploit unused computing capacities in cloud computing environments. These instances, however, are subject to fluctuations in availability that are influenced by the variable supply and demand of computing resources. For example, an increase in the use of on-demand instances can lead to a reduced availability of spot instances, and vice versa. Additionally, heightened demand for spot instances can similarly decrease their availability. In scenarios requiring additional resources, a cloud service provider (CSP) may terminate or suspend a spot instance based on its operational policies to fulfill the needs of an on-demand subscriber.

Consequently, spot instances are particularly beneficial for tasks that demand considerable computational resources for brief durations, such as batch processing and data analytics, or for tasks that can endure short interruptions without substantial disruption. These instances afford entities the flexibility to effectively manage workloads with irregular timings, thereby improving overall operational efficiency.

However, a limitation of spot instances is the unpredictability of their availability. This uncertainty arises because providers may reclaim spot instances with little notice in reaction to surging demand. Despite the low cost that spot instances offer, this unpredictability can deter potential users due to concerns over potential instability and the risk of sudden terminations.

SUMMARY

Cloud service providers (CSPs) physically separate data centers within a region into multiple availability zones (AZs). Each AZ is configured to be isolated from failures in other AZs, providing entities with the option to run highly available applications by distributing resources across multiple locations within a region. One solution for mitigating the unpredictability of spot instances is deploying applications in multiple AZs. However, this solution often results in high egress data traffic across AZs boundaries. Notably, egress data traffic requires the utilization of complex network paths (such as fiber optic cables) and various high-performance network equipment (such as routers, switches, and load balancers, among others) to achieve high network bandwidth. Such hardware demands are translated to higher costs. To avoid egress data traffic, some entities opt for a single-AZ configuration, resulting in lower availability and worse false tolerance.

Embodiments described herein solve the above-described problem by optimizing cloud computing operations across different AZs. A primary AZ and a set of fallback AZs are set for cloud applications. Normally, only the primary AZ is active, reducing the need to manage cross-AZ data traffic. Performance metrics of the primary AZ and fallback AZs are monitored and analyzed. Based on these metrics, the primary AZ could be switched with a fallback AZ when certain conditions are met, ensuring continuous availability and fault tolerance of the cloud applications.

A system determines a set of performance metrics of a plurality of AZs. The determination of a set of performance metrics includes collecting data associated with the plurality of AZs and applying a machine learning model to the collected data to determine values of the set of metrics. The system selects a first AZ for an application based on current values of the set of performance metrics of the plurality of AZs, and causes the application to be deployed on the first AZ. After the application is deployed onto the first AZ, the system continuously monitors the set of performance metrics across the plurality of AZs. In response to determining that performance of the first AZ has declined to a threshold level based on monitoring of the set of performance metrics of the plurality of AZs, the system selects a second AZ for the application based on current values of the set of performance metrics of the plurality of AZs, and causes the application to be switched from the first AZ to the second AZ.

BRIEF DESCRIPTION OF THE DRAWINGS

FIG. 7 illustrates an example graphical user interface (GUI) for setting up or displaying an AZ failover policy in accordance with one or more embodiments.

FIG. 8 illustrates an example cloud service provider (CSP) health dashboard in accordance with one or more embodiments.

FIG. 9 illustrates an example output of a CSP command line interface that lists available zones for a specific project based on a command in accordance with one or more embodiments.

Figure 1:
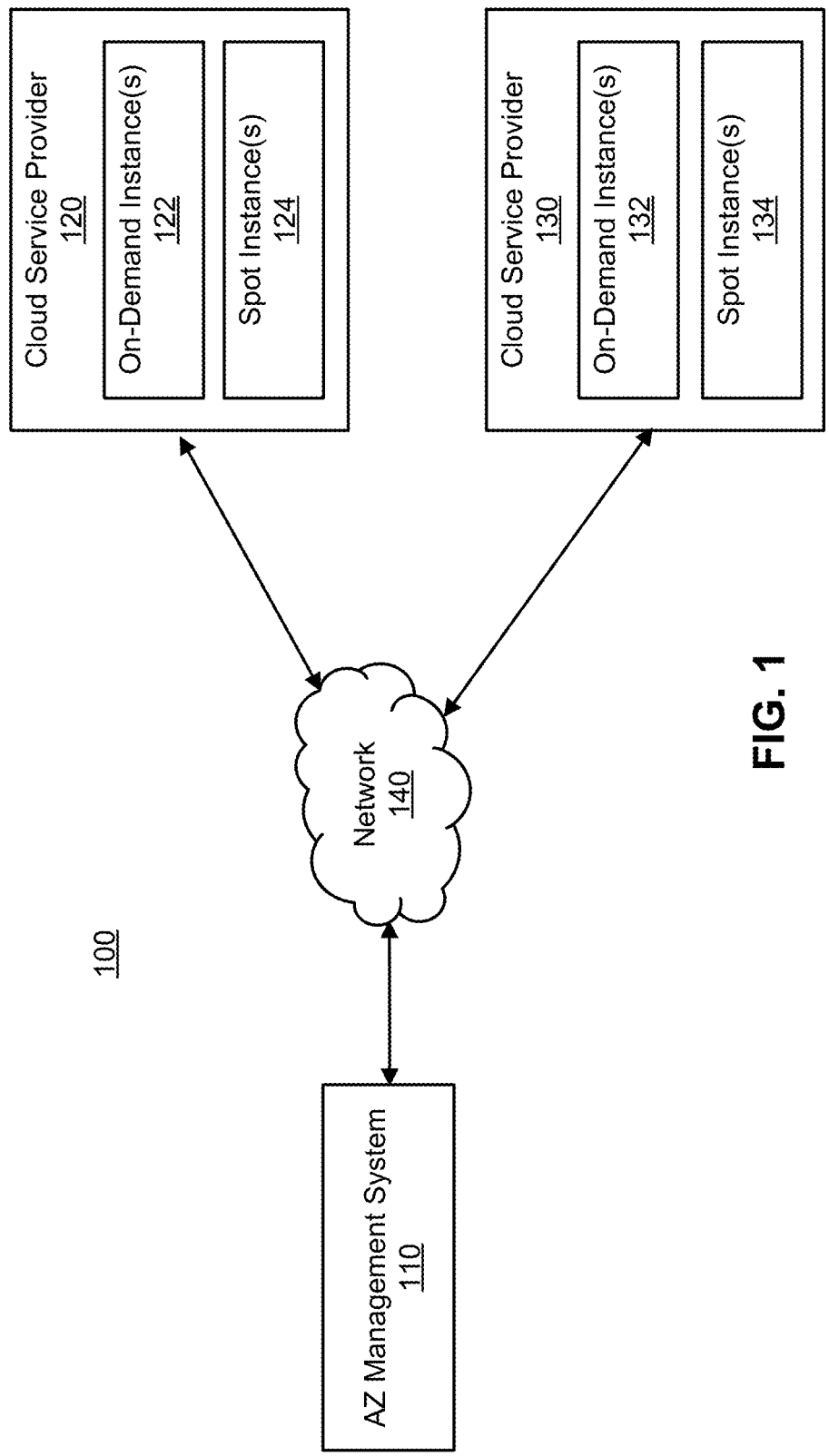
FIG. 1 illustrates an example environment in which an AZ management system operates in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Cloud service providers (CSPs) offer two types of computing instances: on-demand and spot. On-demand instances are always available and billed by the hour or second, while spot instances utilize unused computing capacity at reduced costs but with availability subject to fluctuations due to changes in supply and demand. Increased demand for on-demand instances can limit the availability of spot instances, and CSP policies may allow for the termination or pausing of spot instances to meet on-demand requirements.

Although spot instances are cost-effective and flexible, ideal for tasks like batch processing and data analytics that tolerate brief interruptions, their primary drawback is their unpredictable availability. CSPs may reclaim these instances with little notice, leading to hesitation among users due to potential abrupt terminations. To mitigate this, some entities deploy applications across multiple availability zones (AZs) to ensure high availability. However, this often incurs high network costs from data traffic across AZ boundaries, which can negate the cost benefits of using spot instances.

Embodiments described herein solve the above-described problem by allowing entities to define a primary AZ and a set of fallback AZs for a given cloud application. In high availability scenarios, rather than trying to reduce traffic between AZs, this solution completely eliminates it. Under normal conditions, only one AZ will be active, avoiding the need to handle traffic routing overhead to cut down on cross-AZ data transmission. Additionally, fallback AZs will be on standby, ready to take over should the primary AZ encounter any issues. The primary AZ is just an initial guess or selection, it will change over time as conditions in the cloud change.

In some embodiments, the application is containerized and to be deployed onto a Kubernetes cluster. A pod is the smallest unit in a Kubernetes object model that can be created or deployed. A pod represents a single instance of a running process in a cluster. Initially, a new failover policy is configured at the cluster level. The new policy may be configured by an entity associated with an application, or by an AZ management system. When the entity or the AZ management system enables a pod policy and other cluster-level policies, it also enables the AZ failover policy. In some embodiments, the AZ management system presents a graphical user interface with a list of AZs that are available for the cluster. This list may be discovered during the onboarding and operation of a read-only agent.

In some embodiments, enabling the failover policy includes selecting the primary AZ and acknowledging the fallback AZs that are currently available in the cluster region. The AZ management system assists the entity in the primary AZ selection through a set of indications, such as identifying the currently lowest-priced AZ in conjunction with the lowest interruption rate and insufficient capacity errors (ICE) rate. Lower prices usually correlate with better inventory conditions.

In some embodiments, the failover policy also exposes a set of "failover" conditions. When at least one of these "failover" conditions is satisfied, the primary AZ is switched to a fallback AZ. The set of conditions may be based on spot price instability, spot interruption rate, insufficient capacity errors (ICE) rate, and/or AZ failure rate.

In some embodiments, once the failover policy is set, all future scaling action will occur in the primary AZ, until an AZ switch occurs. When the cluster is onboarded initially, the entity may be given a choice to rebalance all of its nodes to achieve a single AZ state, which prepares them for AZ-failover mode.

The AZ management system periodically checks for the failure conditions that have been configured at the cluster level. Once a failure condition is detected, the system may notify the relevant entities. From there, an automated rebalancing plan is triggered with a newly selected primary AZ. The system will then create new nodes in the newly selected primary AZ, drain legacy nodes, and then finally remove them.

Additional details about the AZ management system are further described below with respect to FIGS. 1-10.

System Architecture

FIG. 1 illustrates an example environment 100 in which an AZ management system 110 operates in accordance with one or more embodiments. In addition to the AZ management system 110, the environment 100 further includes one or more CSPs 120, 130 and a network 140. In alternative configurations, different and/or additional components may be included in the system environment 100. The CSPs 120 and 130 may include (but are not limited to) Amazon Web Service (AWS), Microsoft Azure, and Google Cloud Platform (GCP). CSPs 120, 130 offer various cloud computing services or resources to entities. Entities can deploy applications onto the cloud computing resources offered by CSPs 120, 130. In some embodiments, CSPs 120, 130 may also offer managed Kubernetes services that enable network access to a set of pods running containerized applications. Additional details about CSPs and Kubernetes services are described in U.S. patent application Ser. No. 17/380,729, filed Jul. 20, 2021 (now issued as U.S. Pat. No. 11,595,306), which is incorporated herein in its entirety.

The CSPs 120, 130 offer both on-demand instances 122, 132, and spot instances 124, 134. On-demand instances 122, 132 allow entities to pay for compute capacity by the hour or second (depending on the CSP). Entities can launch an on-demand instance at any time and use it for as long as they need, making on-demand instances an ideal option for applications with unpredictable workloads that cannot be interrupted. Spot instances 124, 134 offer unused computing capacity at significantly lower prices compared to on-demand rates. However, these instances can be reclaimed by the CSP 120, 130 with very short notice if there is an increase in demand or the current spot price exceeds your maximum bid. Spot instances 134, 134 are suitable for flexible, interruption-tolerant applications, such as batch processing jobs, background tasks, and workloads that can be quickly checkpointed and resumed. Pricing for on-demand instances is higher compared to spot instances due to their guaranteed availability.

Each CSP 120, 130 divides geographical areas into multiple regions. Each region is further divided into multiple isolated AZs. Entities can deploy applications and data in AZs of a particular region that are closer to their end users to reduce latency and improve performance. Additional details about AZs are further described below with respect to FIG. 2.

The AZ management system 110 is configured to optimize cloud computing operations across different AZs. In some embodiments, the system 110 determines a set of performance metrics of multiple AZs, selects a first AZ for an application based on current values of the set of performance metrics of the multiple AZs, and causes the application to be deployed on spot instances in the first AZ. The system 110 monitors the performance or values of the set of performance metrics of the multiple AZs. In response to determining that the performance of the first AZ has declined to a threshold level, the system selects a second AZ for the application based on the current values of the set of performance metrics of the multiple AZs, and causes the application to be switched from spot instances in the first AZ to spot instances in the second AZ.

Figure 2:
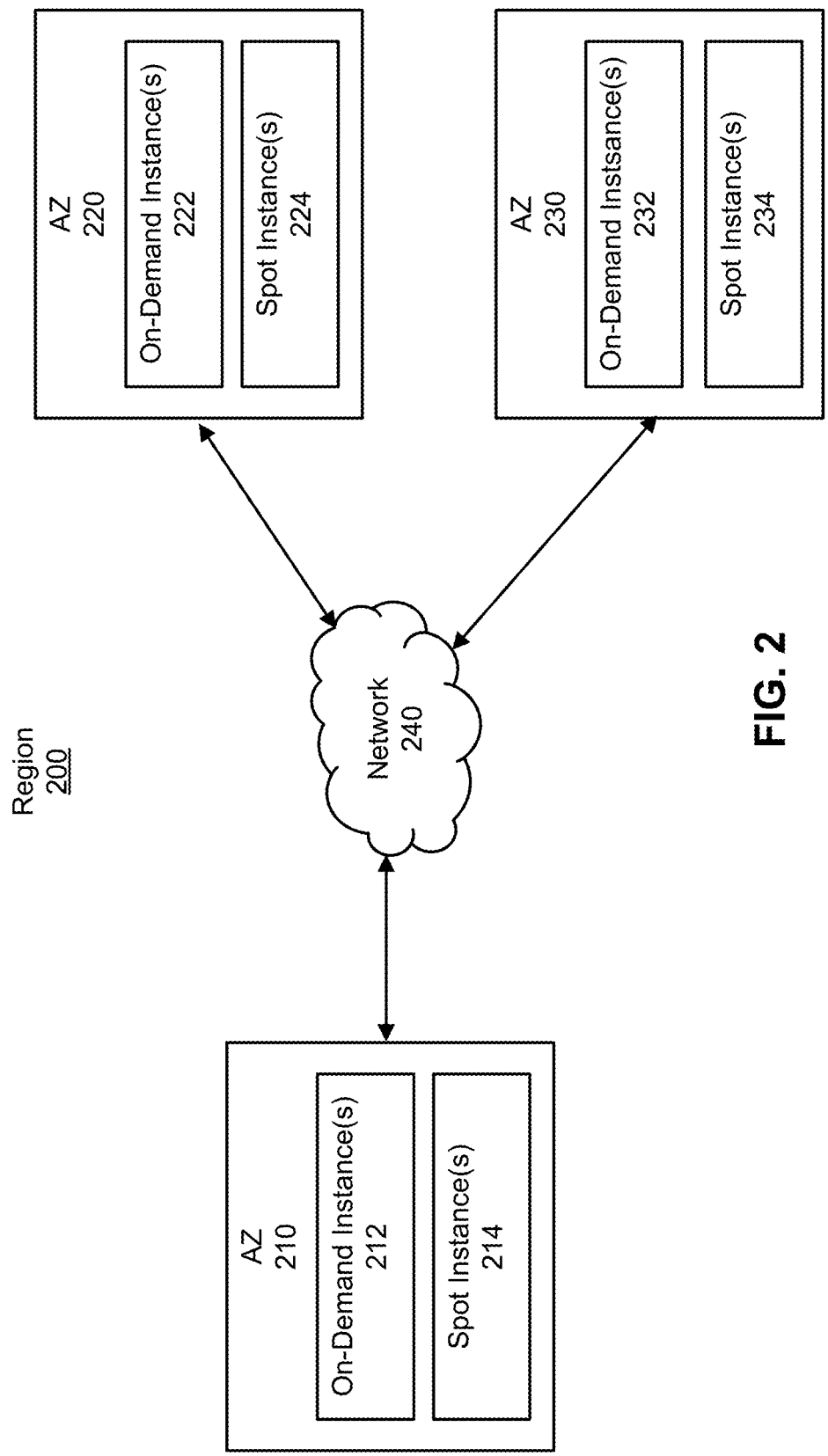
FIG. 2 illustrates an example region of a cloud service provider comprising multiple AZs in accordance with one or more embodiments.

FIG. 2 illustrates an example region 200 of a CSP (e.g., CSP 120, 130) comprising multiple AZs 210, 220, 230. In each of the AZs 210, 220, 230, there are on-demand instances 212, 222, 232, and spot instances 214, 224, 234. The AZs 210, 220, 230 are configured to communicate with each other via network 240.

While the example embodiments described herein involve deploying applications onto spot instances in AZs, these principles can also be applied to on-demand instances. For example, applications may also be deployed onto on-demand instances of a first AZ. In response to determining that the first AZ's performance has declined to a threshold level, the system selects a second AZ and switches the application to on-demand instances of the second AZ. Alternatively or in addition, in response to determining that performance of spot instances in one or more AZs is lower than a threshold, the system may switch applications from spot instances to on-demand instances, or vice versa.

The network 240 includes high-speed, low-latency connections. CSPs often invest in a robust network infrastructure to ensure seamless communication between AZs. For example, AZs may be connected through a dedicated network of fiber optic cables that are redundant. This helps ensure that if one connection fails, there are alternative paths for data to travel. In some embodiments, resources are launched within a virtual private cloud (VPC), which provides a logically isolated network environment. The VPC may span across all AZs within a region, allowing resources in different AZs to communicate with each other using private IP addresses. CSPs may manage the routing of traffic between AZs within a VPC. When a resource in one AZ needs to communicate with a resource in another AZ, the traffic is automatically routed through the network infrastructure. In some embodiments, security groups and network access control lists (NACLs) can also be used to control traffic between resources in different AZs.

Each AZ 210, 220, 230 is isolated from failures in other AZs. For example, each AZ has independent power, cooling, and networking infrastructure, which helps ensure that if one AZ experiences an outage, applications and data hosted in other AZs within the same region remain accessible and operational.

CSPs often encourage entities to deploy resources across multiple AZs to benefit from high availability and fault tolerance. For example, if an entity has a web application, the entity can deploy web servers in multiple AZs and use a load balancer to distribute traffic across them. If one AZ becomes unavailable, the load balancer will automatically route traffic to the healthy web servers in other AZs.

Even though using multiple AZs can provide high availability and fault tolerance, such configurations will incur inter-AZ data transfer (also referred to as "egress" data transfer) using the advanced network infrastructure, e.g., network 240, resulting in much higher costs. Due to the higher costs associated with egress data transfer, entities frequently choose a single-AZ configuration, despite the enhanced availability and fault tolerance provided by a multi-AZ configuration.

Example Architecture of AZ Management System

Figure 3:
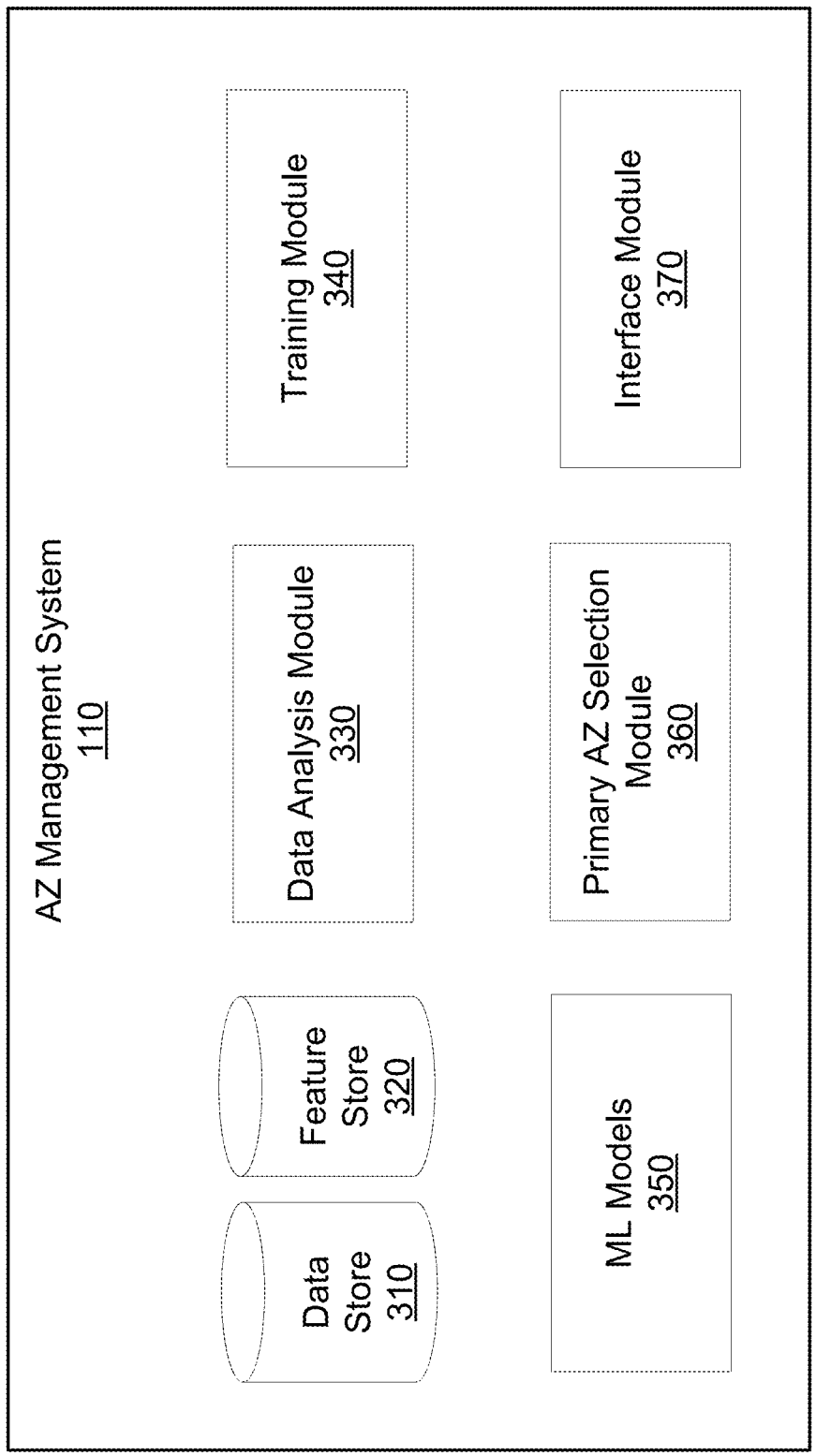
FIG. 3 illustrates an example architecture of AZ management system in accordance with one or more embodiments.

As briefly discussed above, the AZ management system 110 solves this problem by monitoring AZs performance and switching between AZs in response to performance changes. FIG. 3 illustrates an example architecture of AZ management system 110 in accordance with one or more embodiments. The AZ management system 110 includes a data store 310, a feature store 320, a data analysis module 330, a training module 340 configured to train one or more machine learning models 350, a primary AZ selection module 360, and an interface module 370.

The data store 310 is configured to store data collected from spot instances (e.g., spot instances 124, 134) across different regions and CSPs (e.g., CSPs 120, 130). The data store 310 may be a relational database, such as (but not limited to) an SQL database or a PostgreSQL database. The data may include (but are not limited to) spot instance stability, tracking the stability of spot instances over time; resource utilization, tracking CPU, memory, disk, and network usage of spot instances; instance interruptions, tracking when spot instances are interrupted by the CSP; and provisional failures, tracking times when a request to provision resources at a spot instance fails.

The data analysis module 330 extracts features from the data in the data store 310. These features may include (but are not limited to), for each AZ, a number of interruptions that spot instances experience within a specific time window; an average reclamation time (which is an average duration from when a spot instance is reclaimed by the CSP to when it becomes available again); failure rates (which is a frequency of failed requests for spot instances); provisioning latency (which is a time required to provision or start a spot instance after making a request); and cost savings (tracking the cost savings from using spot instances compared to on-demand instances). The feature store 320 is configured to store features extracted from the data stored in the data store 310.

The training module 340 is configured to use the features stored in the feature store 320 to train one or more machine-learning models 340. In some embodiments, the training module 340 is configured to train one or more machine-learning models 350 to predict cloud instance capacities, demand trends, and/or prices at a given AZ and a given CSP. In some embodiments an ARIMA (AutoRegressive Integrated Moving Average) model is trained for forecasting future data points by considering past values in a time series. ARIMA models are well-suited for predicting cloud instance demand trends and/or prices. In some embodiments, a seasonal ARIMA model is trained to further account for seasonality in data. Given cloud usage and demand can exhibit seasonal patterns (e.g., higher demand during business hours), SARIMA may be able to provide more accurate forecasts for certain AZs and/or CSPs, considering the seasonality in data. Linear regression, random forest regression, deep learning models, such as long short-term memory (LSTM) networks, gated recurrent units (GRU), and/or hybrid models may also be trained to forecast spot instances' usage, demand, and cost over time.

The primary AZ selection module 360 is configured to apply the machine learning model 350 to recently collected data associated with AZs to determine values of a set of performance metrics of the AZs, and select a primary AZ based on the values of the metrics. In some embodiments, the values of multiple metrics are aggregated into a single score indicating overall performance of each AZ, and the primary AZ selection module 360 selects an AZ with the best score as a primary AZ during onboarding. After the primary AZ is selected, and an application has been deployed onto the primary AZ, the primary AZ selection module 360 continuously monitors values of the metrics of different AZs. For example, in some embodiments, the primary AZ selection module 360 may be configured to apply the machine learning models 350 periodically (e.g., every a few minutes) to obtain recent values of the metrics. In response to determining that the performance of the primary AZ has declined to a threshold, another AZ is selected as a new primary AZ. In some embodiments, the threshold is an absolute value. When the score of the primary AZ drops below the predetermined value, another AZ with the best score is selected as the primary AZ. Alternatively, the threshold is a relative value compared to other AZs. For example, when the primary AZ's performance is 10% below the performance of a best fallback AZ, the best fallback AZ is selected as the primary AZ.

In some embodiments, the threshold is a failover condition set in a failover policy. In some embodiments, the failover policy may be modified for each application. When at least one of these "failover" conditions is satisfied, the primary AZ is switched to a fallback AZ.

In some embodiments, a set of failover conditions is established based on various metrics including the instability of spot prices, the rate of spot interruptions, the rate of insufficient capacity errors (ICE), and/or the rate of availability zone (AZ) failures. For instance, if the aggregate price of spot nodes within a primary AZ (AZ1), exceeds that of the least expensive fallback AZ (AZ2), by a certain percentage (X %), then AZ1 and AZ2 are switched: AZ2 is set as a new primary AZ, and AZ1 is set as a fallback AZ. This price comparison may be limited to the node types that are utilized within the specific cluster.

Alternatively, or in addition, if the aggregate rate of spot interruptions in AZ1 surpasses that of AZ2 by X %, a similar switching procedure is implemented, setting AZ2 as a new primary AZ, and moving AZ1 to the fallback list. Additionally, this comparison may also be limited to the node types relevant to the cluster.

Another example failover condition involves the ICE rate. If the ICE rate in AZ1 is greater than that in AZ2 by X %, AZ1 is switched with AZ2: AZ2 is set as a new primary AZ, and the former primary AZ, AZ1, is set as a fallback AZ. Like the previous conditions, the comparison of ICE rates may be limited to specific node types within the cluster.

Alternatively, or in addition, another failover condition may be based on service failure reports from a CSP. For example, if the CSP reports indicate issues or service failures in AZ1 lasting for a duration exceeding X minutes, a switch to AZ2 is triggered, and AZ1 is moved to the list of fallback AZs. Notifications of such failures may be received through the CSP's available status API.

The interface module 370 is configured to cause the performance of different AZs and/or decisions to switch primary AZs to be displayed at a client device of a user, and receive user interaction from the client device. In some embodiments, the interface module 370 provides a cluster console to users. The cluster console indicates which AZs are primary and which are designated for failover, which helps users understand the current configuration of their resources. In some embodiments, a warning is shown when policies are set that result in nodes being spread across multiple AZs. This is advantageous during initial onboarding or when nodes are rebalancing to a single AZ. Users are alerted when AZ transition is in progress. In some embodiments, users are notified when an AZ switch is initiated because the process may take some time. Additionally, a notification may be sent once the progress is complete to inform users that their cluster is now stable in a single AZ.

In some embodiments, the AZ management system 110 estimates the cost savings from reduced inter-AZ egress relative to the size of the cluster and reports these savings over specified periods (e.g., daily, weekly, monthly) via the interface module 370. In some embodiments, when an AZ switch begins, the interface module 370 may provide to users any temporary egress costs that may be incurred during the switch.

In some embodiments, users are allowed to define a specific time window for when AZ switch can occur via the interface module 370. This is helpful to avoid triggering switches during busy periods, thus minimizing disruption to business operations.

In some embodiments, when proposing a new balancing plan, only a primary AZ is selected by default. If the entity is not yet in AZ failover mode, the selection of the AZ is performed by the system or by users. In some embodiments, users are also given options to choose between operating in a multi-AZ setup or a single AZ setup according to their preferences.

In some embodiments, for demonstration or testing purposes, during a selection of an AZ switch, a rebalancing plan is created and executed. The progress of the switch can be monitored by observing the progress of the rebalancing via the interface module 370.

For entities using AZ failover, egress costs are expected to drop to zero, except during the migration of the primary AZ. Entities currently using a single AZ strategy will see a significant performance improvement with no or a slight cost increase. Cost savings may vary depending on thresholds set for spot availability, ICE, and spot price drift. Potential cost savings can be around 20-30%, but prices can fluctuate significantly, sometimes as much as 100%, based on the spot instance availability map and internal date. Significantly, a substantial improvement in performance, including enhanced availability and fault tolerance, is almost assured when compared to a conventional single-AZ configuration.

Figure 4:
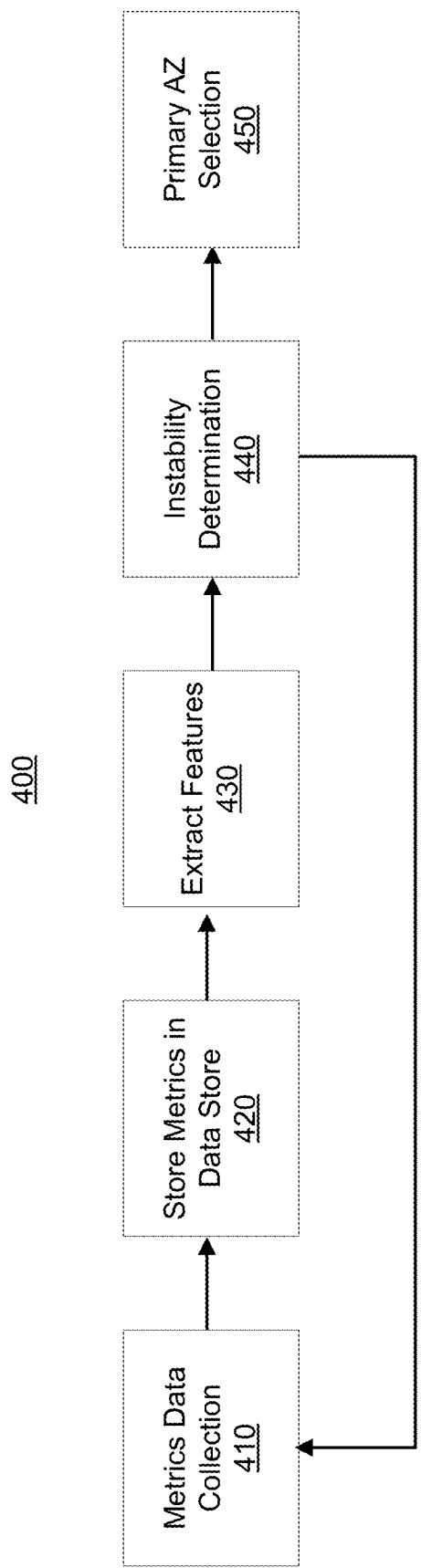
FIG. 4 illustrates an example process of selection of a primary AZ in accordance with one or more embodiments.

FIG. 4 illustrates an example process 400 of selection of a primary AZ in accordance with one or more embodiments. The process 400 may be performed by the primary AZ selection module 360. Data associated with performance metrics of different AZs are collected 410. The tracked metrics data is stored 420 in a data store (e.g., data store 310). The metrics data is analyzed to extract 430 features. In some embodiments, the primary AZ selection module 360 causes the data analysis module 330 to analyze the metrics data stored in the data store 310 to extract features. The extracted features are then stored in the feature store 320. The primary AZ selection module 360 then determines 440 stability or instability of each AZ based on the extracted features. In many cases, the primary AZ remains stable, and no change needs to be made. The data associated with performance metrics of AZs are collected 410 again later. In some embodiments, data associated with performance metrics of AZs are collected 410 periodically, e.g., every few seconds, every few minutes. The steps 420, 430, and 440 are also performed based on the newly collected performance metrics data periodically. In response to determining that the current primary AZ is unstable, a new primary AZ is selected 450, and an application is caused to be switched from the previous primary AZ to the new primary AZ.

Example Metrics Data Collection Processes

In some embodiments, applications are containerized and run on Kubernetes clusters. Kubernetes clusters may be distributed on a particular AZ or across multiple AZs within a region or multiple regions. In some embodiments, each node in a Kubernetes agent includes a Kubernetes agent configured to facilitate communication between the node and a Kubernetes control plane. The agent continuously monitors state of pods in its node, ensuring they are running as specified by the Kubernetes control plane and functioning correctly. If a pod is terminated or crashes, the agent can restart the pod or report its status to the control plane. The agent communicates with a Kubernetes API server to receive instructions and report the status of its node and the pods running on the node. The agent registers the node with the cluster and regularly sends updates on the node's health and resource utilization. The Kubernetes API server acts as a central hub for an entire cluster. It orchestrates all activities by interacting with other components. The Kubernetes API server provides endpoints through which users and other components can interact with the Kubernetes cluster, including managing nodes, pods, services, deployments, and other Kubernetes objects. In some embodiments, Kubernetes agents are configured to transmit data associated with metrics of nodes in different AZs to the AZ management system 110.

Figure 5:
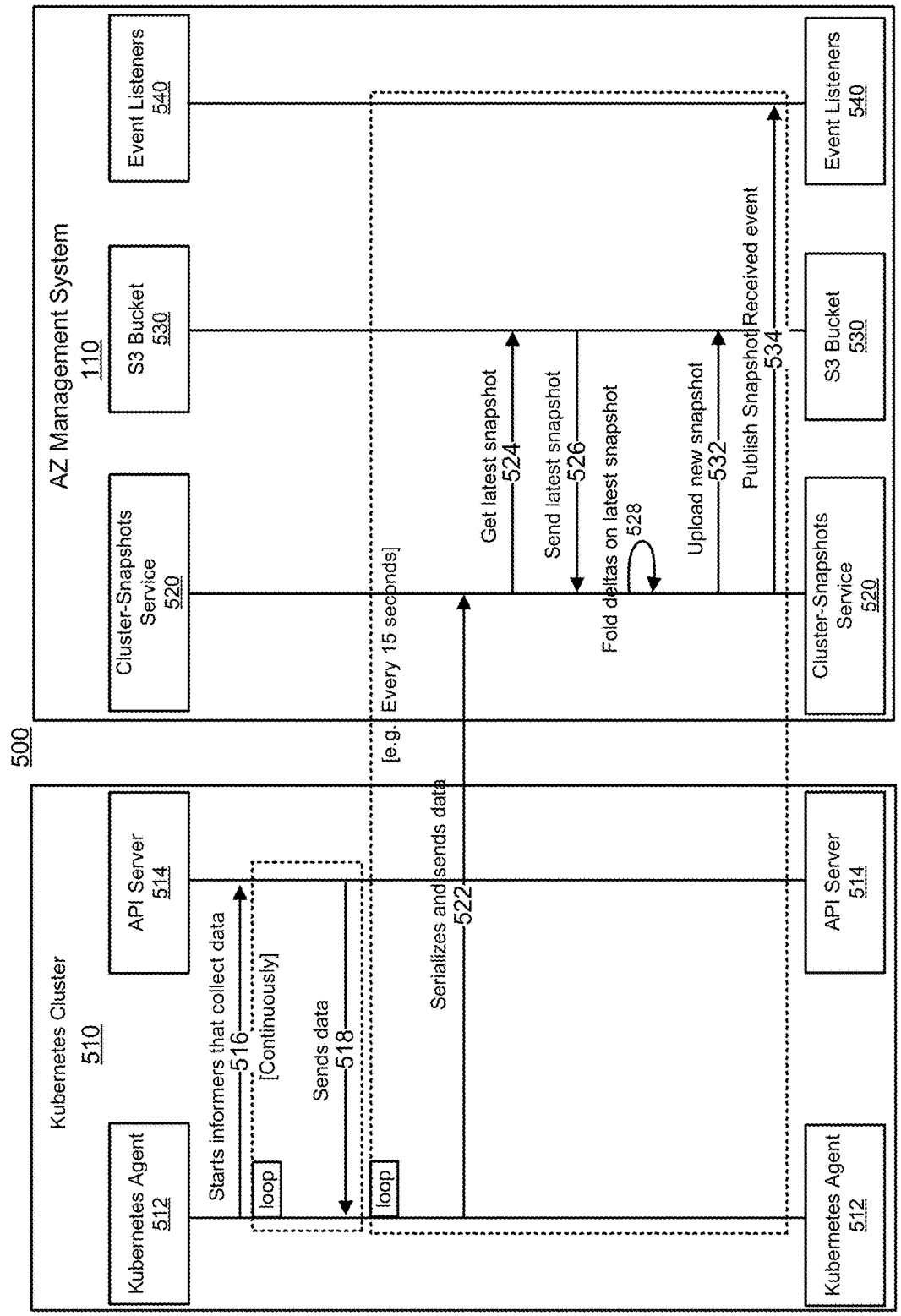
FIG. 5 illustrates an example environment, in which an agent within a Kubernetes cluster is configured to serialize data in the cluster and send the serialized data to an AZ management system in accordance with one or more embodiments.

FIG. 5 illustrates an example environment 500 in which a Kubernetes agent 512 inside a Kubernetes cluster 510 is configured to serialize data and send the serialized data to AZ management system 110 in accordance with one or more embodiments. The Kubernetes cluster 510 is created on a spot instance of a CSP in a particular AZ. A Kubernetes cluster includes one or more nodes, each running a Kubernetes agent 512. The Kubernetes cluster also includes an API server 514. The API server 514 acts as a front-end, allowing users, different parts of the Kubernetes cluster 510 (such as the Kubernetes agent 512), and external components to communicate with the cluster 510. The Kubernetes agent 512 is configured to interact with the Kubernetes API server 514.

The AZ management system 110 includes a cluster-snapshots service 520, an S3 bucket 530, and an event listener 540. The cluster-snapshots service 520 is configured to receive the time-series data from Kubernetes agents on different Kubernetes clusters (e.g., Kubernetes agent 512) on spot instances across different regions and different CSPs. The cluster-snapshots service 520 determines whether the new time-series data is the same as the latest previous time-series data. If they are not the same, the cluster-snapshots service 520 generates a new snapshot based on the new time-series data. Once the new snapshot is generated, the cluster-snapshots service 520 sends it to the S3 bucket 530 for storage. S3 bucket 530 is a storage configured to archive historical snapshots received from the cluster-snapshots service 520.

The Kubernetes agent 512 causes the Kubernetes API server 514 to start informers that collect data (represented by arrow 516). Informers are components in Kubernetes cluster 510 configured to watch registered events, such as (but not limited to) creation, updating, and deletion of resources. The Kubernetes API server 514 passes the collected data to the Kubernetes agent 512 (represented by arrow 518), which in turn passes the received data to the cluster-snapshots service 520 of the system 110 (represented by arrow 522). As illustrated, the Kubernetes agent 512 is configured to serialize the received data and send the serialized data to the cluster-snapshots service 520 periodically, such as (but not limited to) every few seconds, e.g., 15 seconds, every few minutes, etc. The data may include (but are not limited to) data associated with spot instance stability, resource utilization, such as CPU, memory, disk, and network usage of spot instances, instance interruptions, and provisional failures.

In some embodiments, as illustrated in FIG. 5, upon receiving new time-series data from the Kubernetes agent 512, the cluster-snapshots service 520 sends a request for the latest previous snapshot archived at the S3 bucket 530 (represented by arrow 524), prompting the S3 bucket to fetch and forward the latest previous snapshot back to the cluster-snapshots service 520 (represented by arrow 526). At this point, the cluster-snapshots service 520 possesses both the new time-series data and the latest previous snapshot (represented by arrow 528). The cluster-snapshots service 520 is configured to compare the new time-series data with the latest previous snapshot to identify any changes (i.e., delta) in the new time-series data. Upon detecting changes, the cluster-snapshots service 520 generates a new snapshot using the new time-series data and uploads this new snapshot to the S3 bucket 530 for storage (represented by arrow 532). Additionally, the cluster-snapshots service 520 publishes a snapshot-received event to the event listeners 540 (represented by arrow 534).

Figure 6:
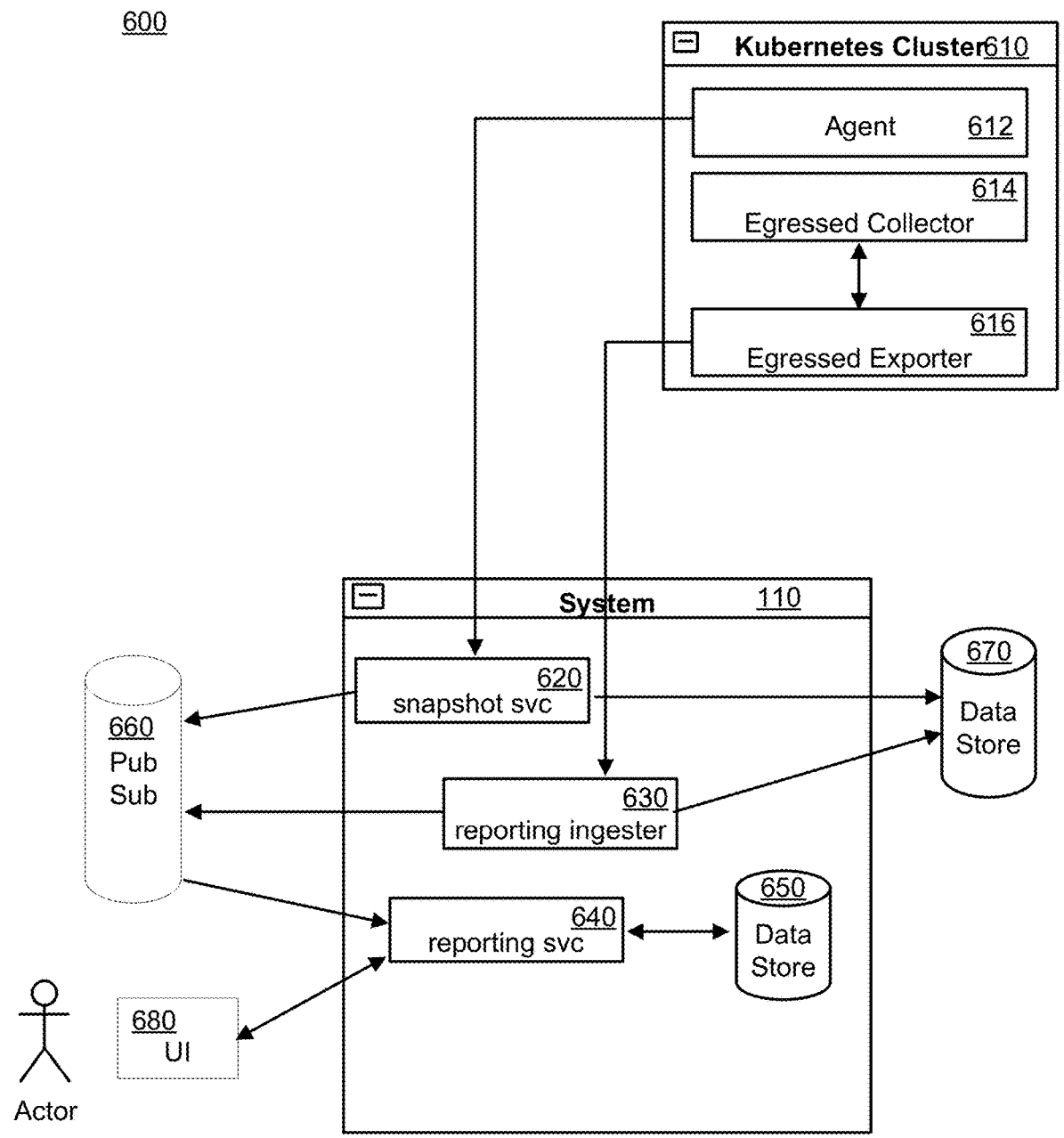
FIG. 6 illustrates another example environment, in which an agent within a Kubernetes cluster facilitates data collection in the cluster and data transmission to an AZ management system in accordance with one or more embodiments.

FIG. 6 illustrates another example environment 600, in which an agent within a Kubernetes cluster facilitates data collection in the cluster and data transmission to the AZ management system 110 in accordance with one or more embodiments. This Kubernetes cluster 610 may be a Kubernetes cluster established on a spot instance within a CSP in a particular AZ. The Kubernetes cluster 610 includes an agent 612, an egressed collector 614, and an egressed exporter 616. The agent 612 causes the egressed collector 614 to collect data. Upon collecting the data, the egressed collector 614 relays this data to the egressed exporter 616.

The AZ management system 110 includes a snapshot service 620, a reporting ingester 630, a reporting service 640, and data stores 650 and 670. The agent 612 is configured to serialize the data and send it to the snapshot service 620, which then processes the data. The snapshot service 620 interacts with a pub-sub system 660 to facilitate real-time data communication. The egressed exporter 616 is configured to transmit the collected data to the reporting ingester 630. The data transmission from the agent 612 and/or the egressed exporter 616 may be triggered by specific events, on a predetermined schedule, or in real-time, based on their configurations. Upon receipt, the reporting ingester 630 undertakes a series of processing tasks, which may include (but are not limited to) data validation, transformation (such as data formatting and aggregation), and enrichment (such as appending metadata). Post-processing, the reporting ingester 630 causes the data to be published in the pub-sub system 660 and its archival in the data store 670, enabling both real-time accessibility and persistent storage.

Upon receiving data from the reporting ingester 630, the pub-sub system 660 broadcasts the data to assorted subscribers according to their respective subscriptions. The broadcasting is performed via the reporting service 640. The reporting service 640 is configured to process and/or aggregate the data from the pub-sub system 660 to prepare it for reporting objectives. The reporting service 640 is configured to produce reports (including heatmaps, tables, charts) and to display these reports on a user interface (UI) 680. Moreover, the reporting service 640 causes the generated reports to be stored in the data store 650 for archiving. In some embodiments, the data store 650 may be an open-source database, such as (but not limited to) a Mimir database. Alternatively, the data store 650 may be a proprietary database provided by the system 110. In some embodiments, the data store 650 allows the reporting service 640 to retrieve historical data or metrics for inclusion in reports, heatmaps, or trend analysis over time.

In addition to obtaining data from agents running on nodes, the AZ management system 110 may also obtain information about the current status of the cloud services and related accounts directly from CSPs. For example, some CSPs offer a health service, which includes a health API. The health service provides information about events that can affect AWS resources, such as scheduled maintenance and unexpected service issues. The health API can be queried to get information about events that may impact the stability of AZs. For example, AWS offers an AWS health API, which can be queried via a command line tool. An example query may be:

aws health describe-events—region us-east-1

Some CSPs also provide a generic health and service dashboard, which displays the service history and status for various services across different regions. The dashboard may include columns for different regions (e.g., North America, South America, and Europe) and displays the service status for each day. The status indicators may show the health of the services, such as whether they are operational or experiencing issues. The data provided by the dashboard may also be ingested into the AZ management system to serve as a source of metrics for the CSPs' health status.

Some CSPs also provide a web feed for each region and service, allowing users to subscribe and receive updates. These feeds can also be ingested into the AZ management system 110 to serve as a source of metrics for the CSPs' health status. In some embodiments, the AZ management system 110 may create an event notification for the web feed and/or an API endpoint. The event notification is generated when specific events occur. For example, in AWS, the event notification may be generated via EventBridge, which is a serverless event bus service that allows the creation of custom event buses. The event notification may be a process of using EventBridge to send notifications when specific events occur. This involves setting up rules in EventBridge that match particular event patterns and then specifying targets to which these events should be routed.

In some embodiments, different CSPs may refer to AZ by different names. For example, in Google Cloud Platform (GCP), the concept similar to AZs used by other CSPs like AWS and Azure is known as "zones," which are isolated locations within a region. Each region includes multiple zones. For example, in the us-east region 1, the zones might be us-east1-a, us-east1-b, us-east-c, and us-east-d. GCP provides a cloud status dashboard and associated cloud health API, which can be used to programmatically check the status and incidents related to GCP services, including potential instability in regions and zones.

Example Embodiments of AZ Switching

As described above, in response to determining that at least one of the failover conditions is satisfied, or the performance of a current primary AZ has declined to a threshold level, the primary AZ is switched. For example, a current primary AZ, AZ1 is set as a fallback AZ, and AZ 2 is set as a new primary AZ.

During switching, new nodes are provisioned in the new primary AZ, AZ2. These nodes are configured to mirror the setup of the nodes in the previous primary AZ, AZ1. Further, any necessary data needs to be synchronized between the new primary AZ and the previous primary AZ. Traffic received from the previous primary AZ is redirected to the new primary AZ, including updating DNS records, load balancers, and other networking configurations. In a Kubernetes cluster, pods are rescheduled to the new nodes in the new primary AZ, including draining pods from the old nodes in the previous primary AZ and starting them on the new nodes in the new primary AZ.

In some embodiments, health checks are performed on the application running on the new primary AZ to ensure everything is operating correctly. This may include (but is not limited to) checking application performance, data integrity, and network connectivity. After all workloads have been moved and validated, the old nodes are terminated to free up resources. In some embodiments, actions and events related to the AZ switching are logged for auditing and troubleshooting purposes. In some embodiments, reports are generated to provide details on the switch, including performance impacts, any issues encountered, and cost implications.

One challenge with the AZ switching is managing persistent volumes because they are often backed by block storages, e.g., elastic block storage (EBS) on AWS. EBS volumes cannot be directly accessed or moved across AZ boundaries. To solve this problem, in some embodiments, the AZ management system 110 is configured to move and detach a pod from a storage on a source node. Upon arrival on a target node, block storage can be re-attached with no significant delay. When moving pods and nodes to AZs where block storage doesn't exist, the AZ management system 110 creates snapshots of the block storage volumes.

An example command for creating a snapshot for an AWS block storage volume may be:

aws ec2 create-snapshot—volume-id vol-1234567890abcdef0—description "Snapshot for AZ migration"

An example command for restoring the snapshot to another volume in a target AZ may be:

aws ec2 create-volume—snapshot-id snap-0123456789abcdef0—availability-zone us-east-1b—volume-type gp2

In some embodiments, Kubernetes uses persistent volumes (PVs) and persistent volume claims (PVCs) to manage storage. A PV is a piece of storage in a cluster that has been provisioned by a user (e.g., an administrator) or dynamically provisioned using Storage Classes. PVs are resources in the cluster independent of any individual pod that uses the PV. PVs exist beyond the lifetime of individual pods. PVC is a request for storage by a user. PVCs consume PV resources. A PVC specifies an amount of storage and access modes of a pod requires. When a PVC is created, Kubernetes attempts to find a suitable PV to bind to the PVC. If a suitable PV does not exist, a PVC can trigger dynamic provisioning of a new PV based on the StorageClass specified.

If PVs are statically provisioned, the system updates the PV definition to point to a new storage location. This may require a mutating controller or a static recreation to avoid issues. If PVs are dynamically provisioned, the system ensures the storage class points to the correct AZ or parameters. In some embodiments, when Kubernetes uses PVCs, there is no need to change the PVC if it is already bound to a PV and the PV update was successful. The PVC will automatically use the updated PV details.

When a CSP, e.g., AWS. restores snapshots from PVs, e.g., internal S3 storage, PVs might experience degraded input/output (I/O) performance and increased latency. This performance issue arises because the restored volumes are not immediately at their maximum performance level. To address this issue, the AZ management system 110 may cause the blocks of each volume to be warmed up, which can be achieved by accessing each block (block by block) using a command, such as 'dd'. The 'dd" command can be used to read/write blocks of data, which helps in pre-loading the data into the cache, thereby reducing initial latency. This process ensures that the volumes are ready for maximum performance more quickly.

Some CSPs provide a service (e.g., Fast Snapshots by AWS) to speed up the process of restoring volumes to maximum performance. However, this service can be prohibitively costly. Pre-warming described above can be effectively accomplished without incurring the high cost of Fast Snapshots, by executing commands, such as 'dd' command.

Example Graphical User Interface

FIG. 7 illustrates an example graphical user interface (GUI) 700 for setting up or displaying an AZ failover policy in accordance with one or more embodiments. The GUI 700 displays a primary AZ selection box and a list of AZs in a region (us-east-1) along with their respective metrics for spot cost, interruption rate, and ICE rate. The system automatically selects a recommended primary AZ is 'us-east-1-f'. The recommendation is based on the latest AZ pricing and stability metrics. The recommended AZ is highlighted on the list of AZs due to its overall low spot cost, low interruption rate, and low ICE rate, indicating high stability and cost-efficiency. The selection box my also allow users to manually choose a different AZ as the primary AZ.

As illustrated, the list of AZs include 'us-east-1-a' through 'us-east-1f. Spot cost is a cost associated with using spot instances in each AZ. For example, the spot cost for 'us-east-1-a' is 0.044, and the spot cost for 'us-east-1-f' is 0.023 the lowest among all the AZs on the list. The interruption rate is a percentage rate at which spot instances are interrupted in each AZ. For example, the interruption rate for 'us-east-1-a' is 5.3%, and 'us-east-1-f' is 1.5%, the lowest among all the AZs on the list. The ICE rate is the insufficient capacity error rate, indicating the likelihood of capacity issues in each AZ. For example, the ICE rate for 'us-east-1-a' is 0.80%, the ICE rate for 'us-east-1-d' is 0.00%, and the ICE rate for 'us-east-1-f' is 0.05. Notably, aside from 'us-east-1-d' having a lower ICE rate, 'us-east-1-f' offers the best combination of spot cost, interruption rate, and ICE rate. Accordingly, the AZ management system 110 recommends and selects 'us-east-1-f' as the primary AZ.

FIG. 8 illustrates an example AWS health dashboard 800 in accordance with one or more embodiments. The health dashboard 800 provides a table of service interruptions over the past month. The table includes a service column listing various AWS services in different regions, filtered to show Amazon Elastic Computed Cloud (EC2) in regions Bahrain, Calgary, Canada-Central, Cape Town, Frankfurt, Hong Kong, Hyderabad, Ireland, and Jakarta. The table also includes an RSS column indicating availability of an RSS feed for each service. The table also includes status for each day columns for specific dates (e.g., today, 29 March, 28 March, etc.) to show the status of the service on those days. Checkmarks indicate the service was operational on that day. In some embodiments, the AZ management system 110 may be configured to query the health dashboard via a health API or RSS feed to obtain status data for different services across various regions, and use this status data, in part, to select a primary AZ.

FIG. 9 illustrates an example output 900 of a Google Cloud Platform (GCP) command line interface that lists available zones for a specific project ('project ABCDE'). A command, "gcloud compute zones list—project project ABCDE", is input into the command line interface. The output lists all the zones within the specified project, including us-east1-b, us-east1-c, us-east1-d, us-east4-c, us-east4-a, us-central1-c, us-central1-a along with their status. Here, all listed zones have the status 'UP', indicating they are operational. There are also two columns, NEXT_MAINTENANCE and TURNDOWN_DATE. These columns are not populated with any data, indicating that no maintenance or turndown is currently scheduled for those zones. In some embodiments, the AZ management system 110 executes the command periodically to obtain status, next maintenance and turndown date associated with AZs of different projects, and use the obtained information, in part, to select primary AZs for the project.

Example Methods for Optimizing Cloud Computing Operations Across Different AZs

Figure 10:
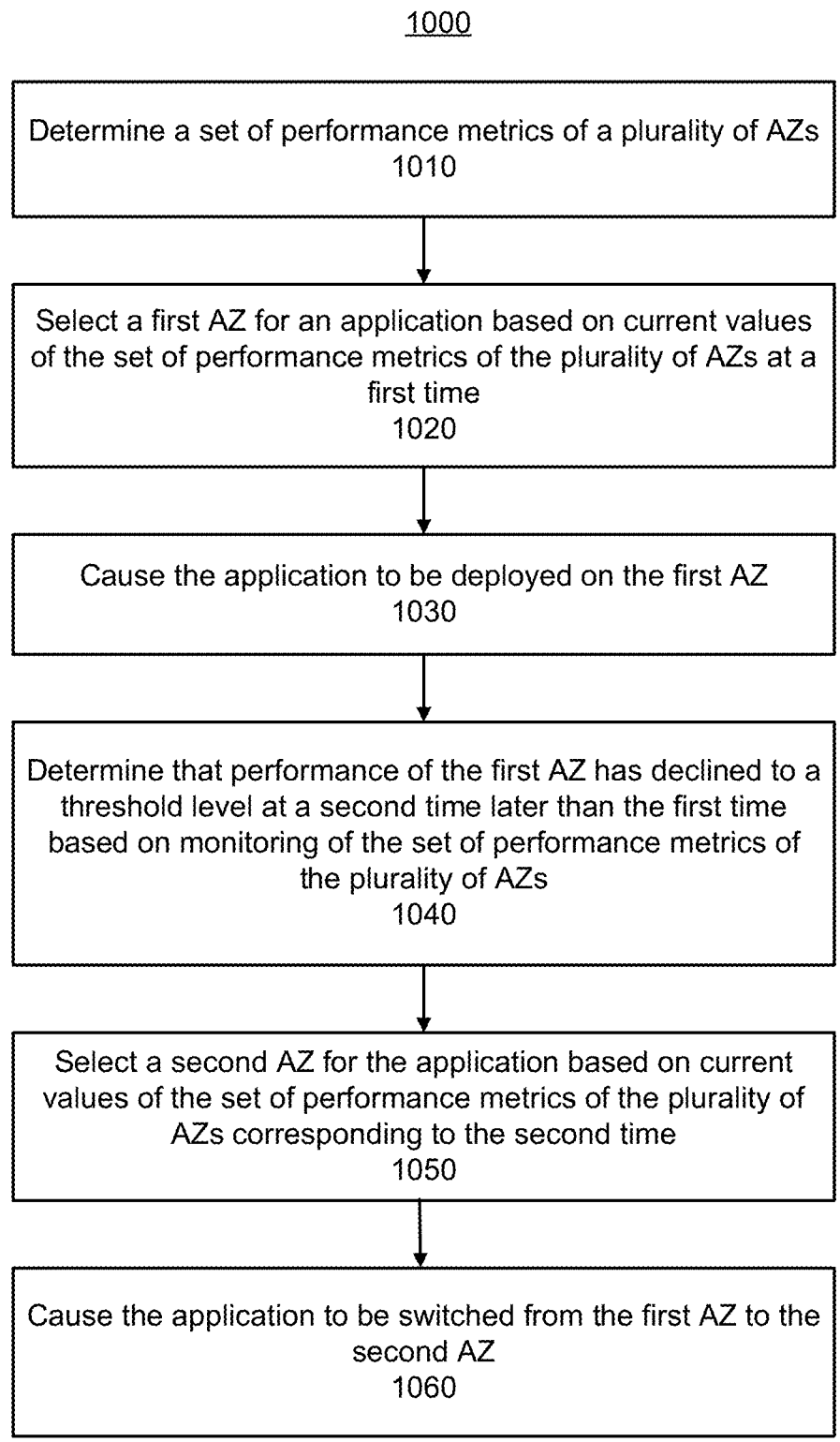
FIG. 10 is a flowchart of a method for optimizing cloud computing operations across different AZs in accordance with one or more embodiments.

FIG. 10 is a flowchart of a method 1000 for optimizing cloud computing operations across different AZs in accordance with one or more embodiments. In various embodiments, the method includes different or additional steps than those described in conjunction with FIG. 10. Further, in some embodiments, the steps of the method may be performed in different orders than the order described in conjunction with FIG. 10. The method described in conjunction with FIG. 10 may be carried out by the AZ management system 110 in various embodiments, while in other embodiments, the steps of the method are performed by any online system capable of performing these steps.

The AZ management system 110 determines 1010 a set of performance metrics of a plurality of AZs. Determination of the set of performance metrics includes collecting data associated with the plurality of AZs and applying a machine learning model to the collected data to determine values of a set of metrics. In some embodiments, data associated with the AZs may be obtained from agents installed on nodes in different AZs, as described above with respect to FIGS. 5-6. For example, a Kubernetes agent may be configured to collect, serialize, and send data associated with a corresponding node to the AZ management system 110 periodically, e.g., every few seconds, every few minutes. Alternatively, or in addition, data associated with AZs may be obtained from CSPs directly via health APIs, as shown in FIGS. 8-9. For example, the AZ management system 110 may execute a query command to request data associated with different AZs from the CSPs periodically, e.g., every few seconds, or every few minutes.

In some embodiments, AZ management system 110 processes the collected data to extract a set of features. The set of features may include (but are not limited to) a timestamp of an interruption of a spot instance, an AZ hosting the spot instance, a reason for the interruption of the spot instance, a resource type associated with the interruption of the spot instance, a timestamp of a refusal of a provisioning request of a spot instance, an AZ hosting the spot instance, a reason for the refusal of the provisioning request, and/or a resource type associated with the provisioning request. The machine learning model is trained over the set of features extracted from historical data associated with the plurality of AZs, and the machine learning model is trained to take a set of features extracted from current data associated with at least one of the plurality of AZs as input and output a performance score indicating performance of the at least one of the plurality of AZs.

In some embodiments, the data associated with the plurality of AZs is collected and processed periodically, e.g., every few seconds, or every few minutes. The machine learning model is applied to the set of features extracted from recently collected data to determine a performance score for each of the plurality of AZs periodically.

The AZ management system 110 selects 1020 a first AZ for an application based on current values of the set of performance metrics of the plurality of AZs at a first time. The AZ management system 110 causes 1030 the application to be deployed on the first AZ. In some embodiments, the performance metrics include an interruption rate of reach AZ. An interruption rate of an AZ refers to a frequency at which spot instances within that AZ are interrupted by the CSP. Notably, spot instances are provided at a reduced cost, but with the risk of being terminated by the provider when there is a higher demand for compute resources or when the spot price exceeds the maximum price that the entity is willing to pay. A higher interruption rate indicates a greater likelihood that spot instances in that AZ will be terminated. It affects the stability and reliability of applications deployed in that AZ. In some embodiments, the performance metrics include a performance score.

In some embodiments, the performance metrics include an ICE rate of each AZ. An ICE rate refers to a percentage of requests for instances or resources that result in an insufficient capacity error within a particular AZ. A higher ICE rate indicates a greater likelihood that entities will encounter capacity issues when attempting to launch instances in that AZ. Factors influencing ICE rates may include (but are not limited to) demand for resources, capacity allocation, and/or instance types. High demand for specific instance types or resources can lead to increased ICE rates. How the cloud provider allocates and manages capacity across different AZs can also affect the ICE rate. Certain instance types may be more prone to capacity issues due to their popularity or limited availability.

In some embodiments, the performance metrics include a service failure for more than a threshold time. This refers to a situation where a cloud service or resource becomes unavailable or non-functional for a period that exceeds a predefined duration threshold. Extended service failure can lead to application downtime, loss of data, and decreased productivity.

After the primary AZ is selected and the application deployed onto the primary AZ, the AZ management system 110 continuously monitors the set of performance metrics of the plurality of AZs. The AZ management system 110 may determine 1040 that the performance of the first AZ has declined to a threshold level at a second time based on monitoring of the set of performance metrics of the plurality of AZs. In response to determining 1040 that performance of the first AZ has declined to a threshold level based on monitoring of the set of performance metrics of the plurality of AZs, the AZ management system 110 selects 1050 a second AZ for the application based on current values of the set of performance metrics of the plurality of AZs corresponding to the second time. Notably, the selection of the second AZ may occur at or after the second time. The AZ management system 110 causes 1060 the application to be switched from the first AZ to the second AZ.

In some embodiments, the threshold level is a failover condition set in a failover policy. In some embodiments, the failover policy may be modified for each application. When at least one of these "failover" conditions is satisfied, the primary AZ is switched to a fallback AZ.

In some embodiments, a set of failover conditions is established based on various metrics including the instability of spot prices, the rate of spot interruptions, the rate of insufficient capacity errors (ICE), or the rate of availability zone (AZ) failures. For instance, if the aggregate price of spot nodes within a primary AZ (AZ1), exceeds that of the least expensive fallback AZ (AZ2), by a certain percentage (X %), then AZ1 and AZ2 are switched: AZ2 is set as a new primary AZ, and AZ1 is set as a fallback AZ. This price comparison may be limited to the node types that are utilized within the specific cluster.

Furthermore, if the aggregate rate of spot interruptions in AZ1 surpasses that of AZ2 by X %, a similar switching procedure is implemented, setting AZ2 as a new primary AZ, and moving AZ1 to the fallback list. Additionally, this comparison may also be limited to the node types relevant to the cluster.

Another example failover condition involves the ICE rate. If the ICE rate in AZ1 is greater than that in AZ2 by X %, AZ1 is switched with AZ2: AZ2 is set as a new primary AZ, and the former primary AZ, AZ1, is set as a fallback AZ. Like the previous conditions, the comparison of ICE rates may be limited to specific node types within the cluster.

Moreover, another failover condition may be based on service failure reports from a CSP. For example, if the CSP reports indicate issues or service failures in AZ1 persisting for a duration exceeding X minutes, a switch to AZ2 is triggered, and AZ1 is moved to the list of fallback AZs. Notifications of such failures may be received through the CSP's available status API.

In some embodiments, in response to determining that at least one of the failover conditions is satisfied, the primary AZ is switchped: AZ 2 is set as a new primary AZ, and the former primary AZ, AZ1, is set as a fallback AZ. During switching, new nodes are provisioned in the new primary AZ, AZ2. These nodes are configured to mirror the set up of the nodes in the previous primary AZ, AZ1. Further, any necessary data needs to be synchronized between the new primary AZ and the previous primary AZ. Traffic received from the previous primary AZ is redirected to the new primary AZ, including updating DNS records, load balancers, and other networking configurations. In a Kubernetes cluster, pods are rescheduled to the new nodes in the new primary AZ, including draining pods from the old nodes in the previous primary AZ and starting them on the new nodes in the new primary AZ. In some embodiments, health checks may be performed on the application running on the new primary AZ to ensure everything is operating correctly. This may include (but is not limited to) checking application performance, data integrity, and network connectivity. After all workloads have been moved and validated, the old nodes are terminated to free up resources. In some embodiments, actions and events related to the AZ switching are logged for auditing and troubleshooting purposes. In some embodiments, reports are generated to provide details on the switch, including performance impacts, any issues encountered, and cost implications.

In some embodiments, when persistent volumes associated with the application is backed by block storage, the AZ management system 110 creates a snapshot of a first block storage volume associated with the application in the first AZ, pre-warms a second block storage volume in a second AZ, and restores the snapshot of the first block storage volume in the second block storage volume in the second AZ.

Example Computing System

Figure 11:
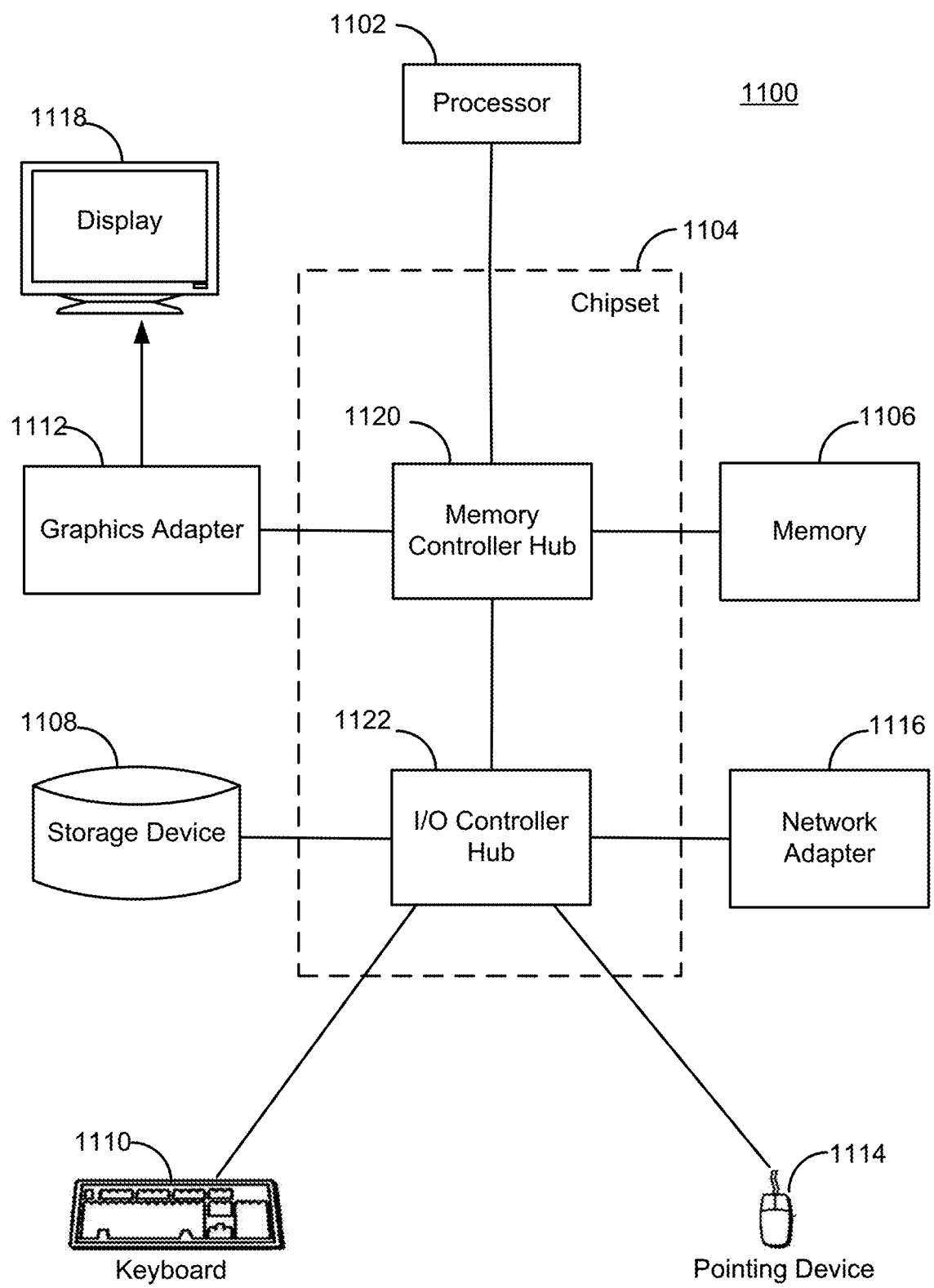
FIG. 11 is a block diagram of an example computer suitable for use in a networked computing environment in accordance with one or more embodiments.

FIG. 11 is a block diagram of an example computer 1100 suitable for use in the networked computing environment 100 of FIG. 1. The computer 1100 is a computer system and is configured to perform specific functions as described herein. For example, the specific functions corresponding to automation system 110 may be configured through the computer 1100.

The example computer 1100 includes a processor system having one or more processors 1102 coupled to a chipset 1104. The chipset 1104 includes a memory controller hub 1120 and an input/output (I/O) controller hub 1122. A memory system having one or more memories 1106 and a graphics adapter 1112 are coupled to the memory controller hub 1120, and a display 1118 is coupled to the graphics adapter 1112. A storage device 1108, keyboard 1110, pointing device 1114, and network adapter 1116 are coupled to the I/O controller hub 1122. Other embodiments of the computer 1100 have different architectures.

In the embodiment shown in FIG. 11, the storage device 1108 is a non-transitory computer-readable storage medium such as a hard drive, compact disk read-only memory (CD-ROM), DVD, or a solid-state memory device. The memory 1106 holds instructions and data used by the processor 1102. The pointing device 1114 is a mouse, track ball, touchscreen, or other types of a pointing device and may be used in combination with the keyboard 1110 (which may be an on-screen keyboard) to input data into the computer 1100. The graphics adapter 1112 displays images and other information on the display 1118. The network adapter 1116 couples the computer 1100 to one or more computer networks, such as network 140.

The types of computers used by the entities and the automation system 110 of FIGS. 1 through 10 can vary depending upon the embodiment and the processing power required by the enterprise. For example, the automation system 110 might include multiple blade servers working together to provide the functionality described. Furthermore, the computers can lack some of the components described above, such as keyboards 1110, graphics adapters 1112, and displays 1118.

ADDITIONAL CONSIDERATIONS

The AZ management system 110, as detailed herein, continuously gathers and evaluates data related to the performance metrics of applications running on spot instances across various availability zones (AZs). It dynamically identifies and designates a primary AZ that offers the best overall performance, thereby ensuring that applications operate within the most optimal environment. This enhances the availability and fault tolerance of the applications. Moreover, by typically operating within a single AZ under normal conditions and switching to alternative AZs only during failovers, the system 110 effectively reduces inter-AZ data transfer, which in turn decreases the bandwidth and hardware requirements. Additionally, the AZ management system 110 employs machine learning models to forecast capacities of cloud instances, trends in demand, and pricing. This adds an intelligent layer that aids in making proactive decisions regarding resource allocation and AZ selection.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcodes, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for optimizing cloud computing operations across different availability zones (AZs) of a cloud service provider (CSP), the method comprising:
   determining a set of performance metrics of a plurality of AZs, comprising:
      collecting data associated with the plurality of AZs; and
      applying a machine learning model to the collected data to determine values of the set of metrics;
   selecting a first AZ for an application based on current values of the set of performance metrics of the plurality of AZs at a first time;
   causing the application to be deployed on the first AZ;
   determining that performance of the first AZ has declined to a threshold level at a second time later than the first time based on monitoring of the set of performance metrics of the plurality of AZs, wherein the performance of the first AZ is associated with a service failure for more than a threshold time;

selecting a second AZ for the application based on current values of the set of performance metrics of the plurality of AZs corresponding to the second time, wherein the performance of the first AZ is associated with an insufficient capacity errors (ICE) rate of the first AZ or a performance of the second AZ is associated with an ICE rate of the second AZ; and causing the application to be switched from the first AZ to the second AZ, wherein the application is switched from the first AZ to the second AZ when the ICE rate of the first AZ is greater than the ICE rate of the second AZ by a threshold value.

2. The method of claim 1, further comprising: setting the first AZ as a primary AZ, and one or more other AZs as fallback AZs at the first time, wherein the second AZ is selected from the fallback AZs at or after the second time.

3. The method of claim 2, further comprising responsive to switching from the first AZ to the second AZ, setting the second AZ as the primary AZ, and setting the first AZ as a fallback AZ at or after the second time.

4. The method of claim 1, wherein the method further comprises processing the collected data to extract a set of features, the set of features comprising a timestamp of an interruption of a spot instance, an AZ hosting the spot instance, a reason for the interruption of the spot instance, a resource type associated with the interruption of the spot instance, a timestamp of a refusal of a provisioning request of a spot instance, an AZ hosting the spot instance, and a reason for the refusal of the provisioning request, and a resource type associated with the provisioning request, and wherein the machine learning model is trained over the set of features extracted from historical data associated with the plurality of AZs, and the machine learning model is trained to take a set of features extracted from current data associated with at least one of the plurality of AZs as input and output a performance score indicating performance of the at least one of the plurality of AZs.

5. The method of claim 1, wherein the performance of the first AZ or the second AZ is associated with an interruption rate of spot instances in the first AZ or the second AZ, and wherein responsive to determining that the interruption rate of the first AZ is greater than the interruption rate of spot instances in the second AZ by a threshold value, causing the application to be switched from the first AZ to the second AZ.

6. The method of claim 1, wherein the performance of the first AZ is associated with a service failure for more than a threshold time, and wherein responsive to determining that the service failure of the first AZ is greater than the threshold time, causing the application to be switched from the first AZ to the second AZ.

7. The method of claim 1, further comprising:

determining that data associated with the application in the first AZ is backed in a first block storage volume in the first AZ;

creating a snapshot of the first block storage volume associated with the application in the first AZ;

pre-warming a second block storage volume in a second AZ; and restoring the snapshot of the first block storage volume in the second block storage volume in the second AZ.

8. The method of claim 1, further comprising:

querying the CSP to obtain data associated with current status, historical status, maintenance schedule, or turndown schedule of the plurality of AZs; and selecting the first AZ or the second AZ for the application further based on the data associated with the current status, historical status, maintenance schedule, or turndown schedule of the plurality of AZs.

9. The method of claim 1, further comprising:

querying the CSP to obtain a spot instance price in each of the plurality of AZs; and selecting the first AZ or the second AZ for the application further based on the obtained spot instance price in each of the plurality of AZs.

10. A non-transitory computer readable storage medium having instructions encoded thereon that, when executed by one or more processors, cause the one or more processors to:

determine a set of performance metrics of a plurality of availability zones (AZs) of a cloud service provider (CSP), comprising:
collecting data associated with the plurality of AZs; and
applying a machine learning model to the collected data to determine values of the set of metrics;

select a first AZ for an application based on current values of the set of performance metrics of the plurality of AZs at a first time;

cause the application to be deployed on the first AZ;

determine that performance of the first AZ has declined to a threshold level at a second time later than the first time based on monitoring of the set of performance metrics of the plurality of AZs, wherein the performance of the first AZ is associated with a service failure for more than a threshold time;

select a second AZ for the application based on current values of the set of performance metrics of the plurality of AZs corresponding to the second time, wherein the performance of the first AZ is associated with an insufficient capacity errors (ICE) rate of the first AZ or a performance of the second AZ is associated with an ICE rate of the second AZ; and cause the application to be switched from the first AZ to the second AZ, wherein the application is switched from the first AZ to the second AZ when the ICE rate of the first AZ is greater than the ICE rate of the second AZ by a threshold value.

11. The non-transitory computer readable storage medium of claim 10, wherein the instructions further cause the one or more processors to set the first AZ as a primary AZ at the first time, and one or more other AZs as fallback AZs, wherein the second AZ is selected from the fallback AZs at or after the second time.

12. The non-transitory computer readable storage medium of claim 11, wherein the instructions further cause the one or more processors to set the second AZ as the primary AZ, and setting the first AZ as a fallback AZ, responsive to switching from the first AZ to the second AZ at or after the second time.

13. The non-transitory computer readable storage medium of claim 10, wherein the instructions further cause the one or more processors to process the collected data to extract a set of features, the set of features comprising a timestamp of an interruption of a spot instance, an AZ hosting the spot instance, a reason for the interruption of the spot instance, a resource type associated with the interruption of the spot instance, a timestamp of a refusal of a provisioning request of a spot instance, an AZ hosting the spot instance, and a reason for the refusal of the provisioning request, and a resource type associated with the provisioning request, and wherein the machine learning model is trained over the set of features extracted from historical data associated with the plurality of AZs, and the machine learning model is trained to take a set of features extracted from current data associated with at least one of the plurality of AZs as input and output a performance score indicating performance of the at least one of the plurality of AZs.

14. The non-transitory computer readable storage medium of claim 10,
wherein the performance of the first AZ or the second AZ is associated with an interruption rate of spot instances in the first AZ or the second AZ, and
wherein responsive to determining that the interruption rate of spot instances in the first AZ is greater than the interruption rate of the second AZ by a threshold value, causing the application to be switched from the first AZ to the second AZ.

15. The non-transitory computer readable storage medium of claim 10,
wherein the performance of the first AZ is associated with a service failure for more than a threshold time, and
wherein responsive to determining that the service failure of the first AZ is greater than the threshold time, causing the application to be switched from the first AZ to the second AZ.

16. The non-transitory computer readable storage medium of claim 10, wherein the instructions further cause the one or more processors to:
determine that data associated with the application in the first AZ is backed in a first block storage volume in the first AZ;
create a snapshot of the first block storage volume associated with the application in the first AZ;
pre-warm a second block storage volume in a second AZ; and
restore the snapshot of the first block storage volume in the second block storage volume in the second AZ.

17. The non-transitory computer readable storage medium of claim 10, wherein the instructions further cause the one or more processors to:
query the CSP to obtain data associated with current status, historical status, maintenance schedule, or turn-down schedule of the plurality of AZs; and
select the first AZ or the second AZ for the application further based on the data associated with the current status, historical status, maintenance schedule, or turn-down schedule of the plurality of AZs.

18. A computing system, comprising:
one or more processors; and
a non-transitory computer readable storage medium having instructions encoded thereon that, when executed by the one or more processors, cause the one or more processors to:
determine a set of performance metrics of a plurality of availability zones (AZs) of a cloud service provider (CSP), comprising:
collecting data associated with the plurality of AZs; and
applying a machine learning model to the collected data to determine values of the set of metrics;
select a first AZ for an application based on current values of the set of performance metrics of the plurality of AZs at a first time;
cause the application to be deployed on the first AZ;
determine that performance of the first AZ has declined to a threshold level at a second time later than the first time based on monitoring of the set of performance metrics of the plurality of AZs, wherein the performance of the first AZ is associated with a service failure for more than a threshold time;
select a second AZ for the application based on current values of the set of performance metrics of the plurality of AZs corresponding to the second time, wherein the performance of the first AZ is associated with an insufficient capacity errors (ICE) rate of the first AZ or a performance of the second AZ is associated with an ICE rate of the second AZ; and
cause the application to be switched from the first AZ to the second AZ, wherein the application is switched from the first AZ to the second AZ when the ICE rate of the first AZ is greater than the ICE rate of the second AZ by a threshold value.

19. The computing system of claim 18, wherein the instructions further cause the one or more processors to:
determine that data associated with the application in the first AZ is backed in a first block storage volume in the first AZ;
create a snapshot of the first block storage volume associated with the application in the first AZ;
pre-warm a second block storage volume in a second AZ; and
restore the snapshot of the first block storage volume in the second block storage volume in the second AZ.

20. The computer system of claim 18,
wherein the instructions further cause the one or more processors to process the collected data to extract a set of features, the set of features comprising a timestamp of an interruption of a spot instance, an AZ hosting the spot instance, a reason for the interruption of the spot instance, a resource type associated with the interruption of the spot instance, a timestamp of a refusal of a provisioning request of a spot instance, an AZ hosting the spot instance, and a reason for the refusal of the provisioning request, and a resource type associated with the provisioning request, and
wherein the machine learning model is trained over the set of features extracted from historical data associated with the plurality of AZs, and the machine learning model is trained to take a set of features extracted from current data associated with at least one of the plurality of AZs as input and output a performance score indicating performance of the at least one of the plurality of AZs.

* * * * *